May 9, 1950 — O. J. CUNNINGHAM — 2,507,095
BABY CARRIAGE ATTACHMENT
Filed April 28, 1947 — 2 Sheets-Sheet 1
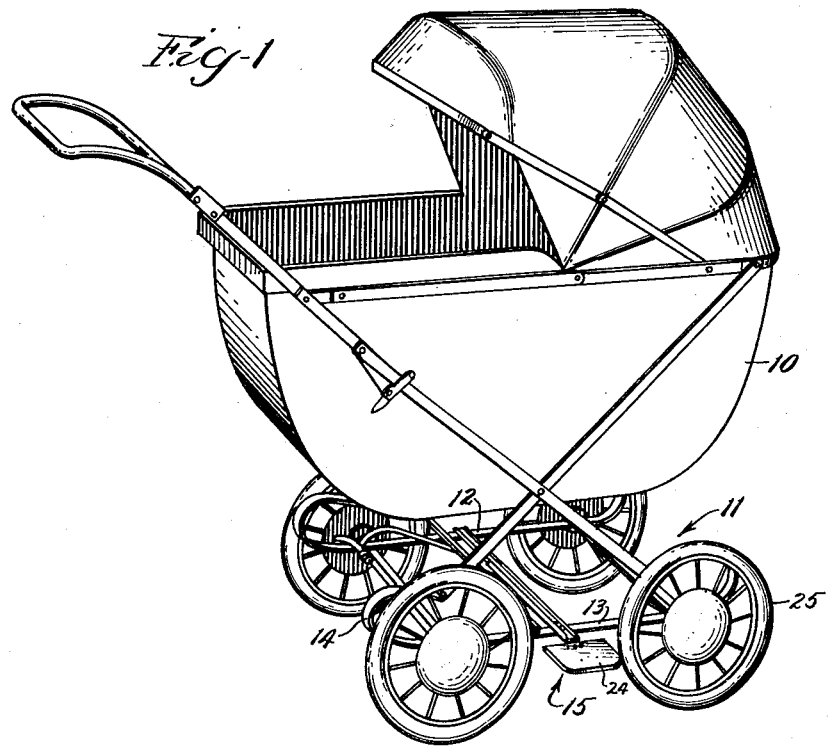
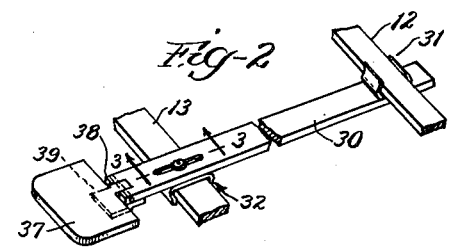
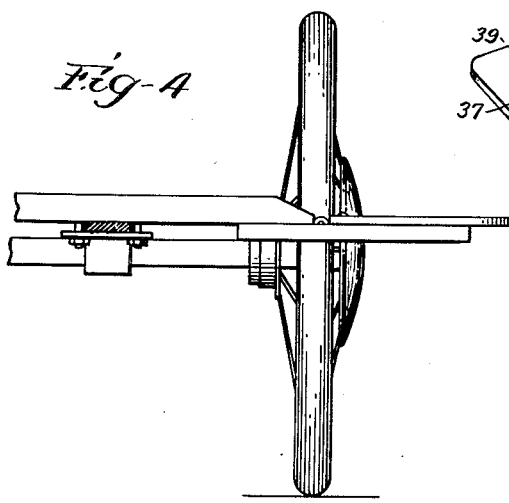
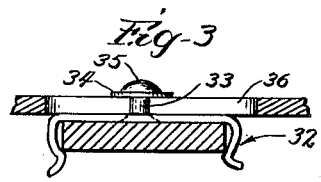
Inventor
Orval J. Cunningham
By:- Mann and Brown
Attys.

May 9, 1950     O. J. CUNNINGHAM     2,507,095
BABY CARRIAGE ATTACHMENT
Filed April 28, 1947     2 Sheets-Sheet 2
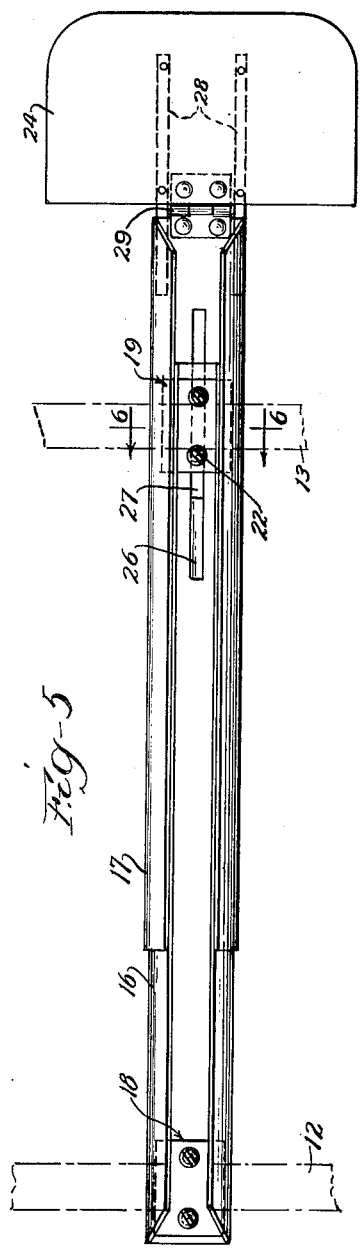
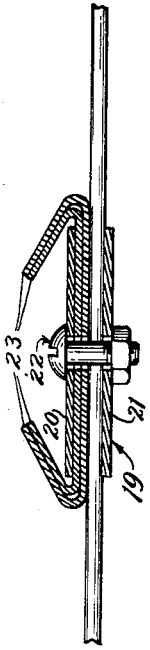
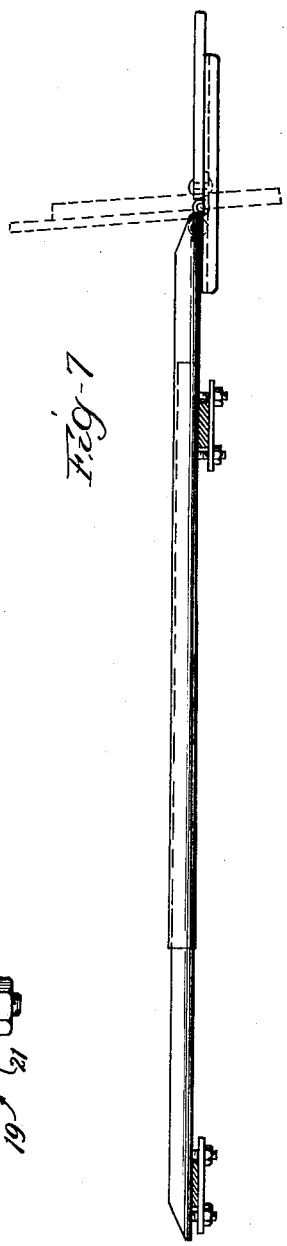
Inventor
Orval J. Cunningham
By:- Mann and Brown
Attys.

UNITED STATES PATENT OFFICE 2,507,095

BABY CARRIAGE ATTACHMENT

Orval J. Cunningham, Evanston, Ill.

Application April 28, 1947, Serial No. 744,283

11 Claims. (Cl. 280—166)

This invention relates to a simple attachment which may be applied to a baby carriage or stroller to provide a step upon which a child may ride when crossing streets or when the child becomes tired.

A mother oftentimes when wheeling her baby in a carriage or stroller, will have an older child walking with her, and there are times when it is important for the mother to have close control over the older child, as, for example, when crossing streets or going through mud puddles. This can be accomplished very easily by providing a simple step arrangement at the side of the carriage or stroller for the child to stand upon while crossing the street or going through the puddle.

Oftentimes also, a child walking with its mother will become tired or the mother may wish to walk faster than the child can walk. Under such circumstances also, a step arrangement of the type that I have invented is of great assistance to the mother.

The principal object of this invention, therefore, is to provide an inexpensive, preferably detachable, step arrangement which may be mounted upon the frame of existing baby carriages and strollers for supporting the child in such manner that it will not throw the carriage or stroller out of balance or materially interfere with the pushing of the carriage or its manipulation around corners, over curbs, etc. It is a further object of this invention to provide such a step arrangement with the step itself swingable to a position that is out of the way and does not interfere with storage of the carriage.

Further and other objects and advantages will become apparent as the disclosure proceeds and the description is read in conjunction with the accompanying drawings in which:

Fig. 1 is a perspective view showing a baby carriage equipped with one embodiment of my invention;

Fig. 2 is a perspective fragmentary view showing another form of the invention;

Fig. 3 is a fragmentary section view taken on a line 3—3 of Fig. 2, showing the manner in which the step of Fig. 2 is adjustable to fit different carriages;

Fig. 4 is a side elevational view of a portion of the step unit shown in Fig. 1 with the step shown in lowered position;

Fig. 5 is a plan view showing the step unit of Fig. 1;

Fig. 6 is a sectional view taken on the line 6—6 of Fig. 5;

Fig. 7 is a side elevational view showing in dotted lines the step in its raised position.

It will be understood that the invention may be variously embodied within the scope of the appended claims, and the description of specific forms of the invention is for the purpose of complying with Section 4888 of the Revised Statutes and should not be interpreted as limiting the appended claims except as may be required by the prior art.

The invention is applicable to almost all types of baby carriages, strollers, and the like, and in Fig. 1 a baby carriage is shown of conventional form, having a body 10 carried by a wheeled frame, generally designated 11, which includes a pair of longitudinally arranged frame members 12 and 13 made of strap iron and curved at their ends as indicated at 14 to form spring elements which support the body 10.

The step unit, generally designated 15, is mounted across the frame members 12 and 13 and is provided with a step at one or both ends upon which a child may stand.

Considering first the form of the invention shown in Figs. 1, 4, 5, 6, and 7, the step unit comprises telescoping shank members 16 and 17, each being formed of sheet metal and being shaped in cross section as shown in Fig. 6. Fastening devices 18 and 19 are mounted on the shank members 16 and 17 respectively for clamping the step unit to the frame members 12 and 13, and these fastening devices may be of any suitable form, here being shown as comprising upper and lower retaining plates 20 and 21 respectively which are clamped to the shank of the step unit and the frame members 12 and 13 by nuts and bolts, generally indicated at 22.

The shank members 16 and 17 each have inwardly directed flanges as shown at 23. These interengage to permit the shank members to have relative telescoping movement.

One of the retaining devices for clamping the step unit to the carriage frame, in this instance, the retaining device 19, is made adjustable relative to the retaining device 18 to enable the step unit to be secured to carriages in which the frame members 12 and 13 may be variably spaced. It is also desirable to have the step 24 adjustable outwardly so that it may be positioned properly with respect to the line of the wheels 25. This is accomplished in the present invention by providing the shank members 16 and 17 with cooperating elongating slots 26 and 27 respectively through which the fasteners 22 of the retaining device 19 extend, with the result that when the fasteners are loose, the retaining device itself may be adjusted in the slots 26 and 27 relative to the retaining device 18, thereby to adapt itself to the spacing between the frame members 12 and 13, and at the same time the shank member 17 which carries the step 24 may be moved outwardly the distance for properly positioning the step 24 relative to the wheels 25. When these adjustments have been made, the fasteners 22 are made secure and the step unit is then firmly attached to the carriage frame.

The step 24 may be secured to the shank member 17 in any suitable manner but preferably it is hinged thereto as shown at 29, and in order to limit the downward movement of the step to a horizontal position, a pair of stop arms 28 are securely fastened to the under side of the step and project rearwardly a sufficient distance to engage the under side of the shank member 17 when the step is in lowered position (as best shown in Figs. 5 and 7).

The weight of the child on the step is carried through the stop arms 28 and shank member 17 to the other shank member 16 and to the frame of the carriage.

The pintle of the hinge 29 may be sufficiently tight to retain the step in its desired raised position, or if preferred, suitable spring means not shown may be employed for normally biasing the step to its raised position.

It will be understood that although the step is shown only at one end of the unit, the adjustable slot arrangement used in conjunction with the securing of the step unit to the frame member 13 could be duplicated on the other side of the carriage to enable a step to be provided on that side also.

A somewhat simplified embodiment of the invention is shown in Figs. 2 and 3 and, in this case, the step unit consists merely of a piece of strap iron 30 or other suitable material which is adapted to pass under the longitudinal frame member 12 and be secured thereto as by clip 31, and rest upon the other longitudinal frame member 13 to which it is secured by an adjustable clip 32. The clip 32 is similar to the clip 31 except that instead of being rigidly secured to the bar 30, it is provided with a pin and slot connection whereby the clip 32 is made adjustable lengthwise of the bar 30 as shown in Fig. 3. Preferably the pin 33 is rigidly secured to the clip 32 and is provided with a washer 34 over which the pin is peened as at 35 to hold the pin in place within the slot 36.

The step 37 may be hinged in a suitable manner as indicated at 38 to the bar 30, and it also has stop member 39 rigidly secured to its under side for cooperation with the bar 30 to fix the horizontal position of the step.

The step unit of this invention is inexpensive, easy to install, and provides a very useful aid to mothers who have to be concerned about a child walking alongside a carriage or stroller.

I claim as my invention:

1. In baby carriages, strollers, and the like having a frame comprising spaced longitudinal frame members supported by a pair of front wheels and a pair of rear wheels, the combination therewith of a step unit comprising a shank extending transversely across and supported by said frame members, said shank being connected to one of said frame members by a fastening means which is secured to and movable longitudinally of the shank, and a step carried at one end of the shank, and positioned between the front and rear wheels on one side of the carriage to enable a child to stand thereon while the carriage or stroller is in motion.

2. In baby carriages, strollers, and the like having a frame comprising spaced longitudinal frame members supported by a pair of front wheels and a pair of rear wheels, the combination therewith of a step unit comprising a shank extending transversely across and supported by said frame members, said shank being connected to one of said frame members by a fastener which is affixed to and movable longitudinally of the shank between the ends of a predetermined section thereof, and a pivoted step carried at one end of the shank, and positioned between the front and rear wheels on one side of the carriage to enable a child to stand thereon while the carriage or stroller is in motion, said step being swingable about its pivot to at least a substantially vertical position.

3. In baby carriages, strollers, and the like having a frame comprising spaced longitudinal frame members supported by a pair of front wheels and a pair of rear wheels, the combination therewith of a step unit comprising an adjustably extensible shank extending transversely across and supported by said frame members, and a step carried at one end of the shank, and positioned between the front and rear wheels on one side of the carriage to enable a child to stand thereon while the carriage or stroller is in motion, said step being pivotally secured to one end of said shank and being retractible to a position substantially in line with the adjacent wheels or therebeyond.

4. In baby carriages, strollers, and the like having a frame comprising spaced longitudinal frame members supported by a pair of front wheels and a pair of rear wheels, the combination therewith of a step unit comprising a shank extending transversely across and supported by said frame members, and a step carried at one end of the shank, and positioned between the front and rear wheels on one side of the carriage to enable a child to stand thereon while the carriage or stroller is in motion, said shank being extensible for adjusting the position of the step relative to the adjacent wheels.

5. In baby carriages, strollers, and the like having a frame comprising spaced longitudinal frame members supported by a pair of front wheels and a pair of rear wheels, the combination therewith of a step unit comprising a shank extending transversely across and supported by said frame members, and a step carried at one end of the shank, and positioned between the front and rear wheels on one side of the carriage to enable a child to stand thereon while the carriage or stroller is in motion, said shank having fastening devices secured thereto for engaging said frame members, at least one of said fastening devices being adjustable along said shank.

6. In baby carriages, strollers, and the like having a frame comprising spaced longitudinal frame members supported by a pair of front wheels and a pair of rear wheels, the combination therewith of a step unit comprising a shank extending transversely across and supported by said frame members, and a step carried at one end of the shank, and positioned between the front and rear wheels on one side of the carriage to enable a child to stand thereon while the carriage or stroller is in motion, said shank having fastening devices secured thereto for engaging said frame members, at least one of said fastening devices being adjustable along said shank, said shank being composed of inwardly flanged telescoping members having a pin and slot connection with the pin carrying the adjustable fastening device.

7. In baby carriages, strollers, and the like having a frame comprising spaced longitudinal frame members supported by a pair of front wheels and a pair of rear wheels, the combination therewith of a step unit comprising a shank extending transversely across and supported by said frame members, and a pivoted step carried at one end of the shank, and positioned between the front and rear wheels on one side of the carriage to enable a child to stand thereon while the carriage or stroller is in motion, said step being swingable about its pivot to at least a substantially vertical position, and having a stop for limiting downward swinging movement of the step to a substantially horizontal position.

8. In baby carriages, strollers, and the like having a frame comprising spaced longitudinal frame members supported by a pair of front wheels and a pair of rear wheels, the combination therewith of a step unit comprising a shank extending transversely across and supported by said frame members, and a step carried at one end of the shank, and positioned between the front and rear wheels on one side of the carriage to enable a child to stand thereon while the carriage or stroller is in motion, said shank being formed in one piece and adapted to have one end thereof engage the under side of one of the frame members, and the other end rest upon the other frame member, and a step carried at the latter end of the shank.

9. In baby carriages, strollers, and the like, having a frame comprising spaced longitudinal frame members supported by a pair of front wheels and a pair of rear wheels, the combination therewith of a step unit comprising a shank extending transversely across and supported by said frame members, said shank having a longitudinal slot vertically through the body thereof, a fastening device for engaging one of said frame members and movably secured to the shank between the slotted ends thereof, and a step carried at one end of the shank and positioned between the front and rear wheels on one side of the carriage to enable a child to stand thereon while the carriage or stroller is in motion.

10. In baby carriages, strollers, and the like, having a frame comprising spaced longitudinal frame members supported by a pair of front wheels and a pair of rear wheels, the combination therewith of a step unit comprising a shank extending transversely across and supported by said frame members, said shank having a longitudinal slot vertically through the body thereof, a fastening device for engaging one of said frame members and movably secured to the shank between the ends of said slot, and a pivoted step carried at one end of the shank and positioned between the front and rear wheels on one side of the carriage to enable a child to stand thereon while the carriage or stroller is in motion, said step being swingable about its pivot to at least a substantially vertical position.

11. In baby carriages, strollers, and the like, having a frame comprising spaced longitudinal frame members supported by a pair of front wheels and a pair of rear wheels, the combination therewith of a step unit comprising a longitudinally slotted shank extending transversely across and supported by said frame members, said shank being connected to one of said frame members by a fastening means affixed to the shank and movable longitudinally with respect thereto between the slotted ends thereof, and a step carried at one end of the shank and positioned between the front and rear wheels on one side of the carriage to enable a child to stand thereon while the carriage or stroller is in motion, said shank being extensible for adjusting the position of the step relative to the adjacent wheels.

ORVAL J. CUNNINGHAM.

REFERENCES CITED

The following references are of record in the file of this patent:

UNITED STATES PATENTS

| Number | Name | Date |
| --- | --- | --- |
| 398,496 | Cork | Feb. 26, 1889 |
| 454,712 | Morton | Sept. 3, 1895 |
| 642,215 | Erikson | Jan. 30, 1900 |
| 994,077 | Harding | May 30, 1911 |
| 1,350,253 | Caviness | Aug. 17, 1920 |
| 1,428,030 | Heaton | Sept. 5, 1922 |
| 1,702,691 | Heberling | Feb. 19, 1929 |
| 2,145,647 | Evans | Jan. 31, 1939 |
| 2,209,576 | McDonald | July 30, 1940 |
| 2,316,389 | Atkinson | Apr. 13, 1943 |